United States Patent
Yamada et al.

(10) Patent No.: US 8,605,334 B2
(45) Date of Patent: Dec. 10, 2013

(54) RECORDING SYSTEM, RECORDING APPARATUS, AND CONTROL METHOD THEREFOR

(75) Inventors: Akitoshi Yamada, Kanagawa-ken (JP); Hiromitsu Hirabayashi, Kanagawa-ken (JP); Takao Aichi, Tokyo (JP); Fumihiro Goto, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 2211 days.

(21) Appl. No.: 11/047,583

(22) Filed: Feb. 2, 2005

(65) Prior Publication Data

US 2005/0128528 A1    Jun. 16, 2005

Related U.S. Application Data

(63) Continuation of application No. PCT/JP03/09870, filed on Aug. 4, 2003.

(30) Foreign Application Priority Data

Aug. 5, 2002    (JP) ................................ 2002-228031

(51) Int. Cl.
*H04N 1/00*    (2006.01)

(52) U.S. Cl.
USPC ............ 358/435; 358/1.15; 358/1.1; 358/448

(58) Field of Classification Search
USPC .................. 358/1.1, 1.9, 1.15, 1.6, 435, 448; 370/466, 401

See application file for complete search history.

(56) References Cited

U.S. PATENT DOCUMENTS

| | | | |
|---|---|---|---|
| 5,457,784 A | 10/1995 | Wells et al. | |
| 5,784,581 A | 7/1998 | Hannah | |
| 6,529,522 B1 * | 3/2003 | Ito et al. | 370/466 |
| 6,823,367 B1 * | 11/2004 | Wakasugi et al. | 709/206 |
| 7,401,213 B2 * | 7/2008 | Tateyama et al. | 713/1 |
| 2001/0013949 A1 * | 8/2001 | Tateyama | 358/1.16 |

(Continued)

FOREIGN PATENT DOCUMENTS

| | | | |
|---|---|---|---|
| GB | 2351576 A | 1/2000 | |
| JP | 1-126044 | 5/1989 | ............ H04L 13/00 |
| JP | 3-147447 | 6/1991 | |
| JP | 11-154123 | 6/1999 | ............ G06F 13/00 |

OTHER PUBLICATIONS

European Search Report dated Jul. 8, 2010 concerning European Patent Application No. 03766723.5.

(Continued)

*Primary Examiner* — King Poon
*Assistant Examiner* — Iriana Cruz
(74) *Attorney, Agent, or Firm* — Fitzpatrick, Cella, Harper & Scinto (57) ABSTRACT

A physical layer which depends on hardware of a general-purpose interface determines whether an image supply device supports a predetermined communication protocol. A transport layer which controls communication as an upper layer of the physical layer determines whether the image supply device supports the predetermined communication protocol. When either of the physical and transport layers determines that the image supply device supports the predetermined communication protocol, the image supply device is decided to support the predetermined communication protocol. When both of the physical and transport layers do not determine that the image supply device supports the predetermined communication protocol, an application layer serving as an upper layer of the transport layer determines whether the image supply device supports the predetermined communication protocol.

4 Claims, 8 Drawing Sheets

(56) References Cited

U.S. PATENT DOCUMENTS

2003/0174351 A1 9/2003 Kawanabe et al. ............ 358/1.9
2003/0227648 A1 12/2003 Oshima et al. ............... 358/1.15
2004/0223185 A1 11/2004 Yamada et al. .............. 358/1.15
2005/0036160 A1 2/2005 Goto et al. ..................... 358/1.9
2005/0099647 A1 5/2005 Aichi .......................... 358/1.15

OTHER PUBLICATIONS

U.S. Appl. No. 10/785,012 (Masumoto et al.), filed Feb. 25, 2004.

\* cited by examiner

RECORDING SYSTEM, RECORDING APPARATUS, AND CONTROL METHOD THEREFOR

CROSS REFERENCE TO RELATED APPLICATION

This application is a continuation of International Application No. PCT/JP2003/009870 filed Aug. 4, 2003, which in turn claims the benefit of priority based on Japanese Application No. 2002-228031 (Pat.) filed on Aug. 5, 2002. International Application No. PCT/JP2003/009870 has been published in English as International Publication No. WO 2004/014042 A1.

TECHNICAL FIELD

The present invention relates to a recording system which records an image on the basis of image data from an image supply device such as a digital camera, a recording apparatus, and a control method therefor.

BACKGROUND ART

In recent years, digital cameras (image sensing apparatuses) capable of photographing an image by a simple operation and converting the photographed image into digital image data have widely been used. To print an image photographed by this camera and use the print as a photograph, the photographed digital image data is temporarily input from the digital camera to a PC (computer), and undergoes image processing by the PC. Then, the processed data is output from the PC to a color printer, which prints the image data.

To the contrary, there have been developed color print systems capable of directly transferring digital image data from a digital camera to a color printer and printing the data without the mediacy of any PC, and so-called photo direct (PD) printers capable of directly mounting in a color printer a memory card which is mounted in a digital camera and stores a sensed image, and printing the photographed image stored in the memory card.

Especially when image data is to be directly transferred from a digital camera to a printer and printed, demands have arisen for the advent of a photo direct printer capable of coping with digital cameras of various vendors because the specifications and operating methods of digital cameras are different between vendors. Such photo direct printer receives and prints image data not only from the above-mentioned digital camera, but also from a cell phone, PDA, and other devices. Further, the printer has various functions. The printer and image supply device must confirm whether they can communicate with each other in accordance with a predetermined communication protocol.

In confirming whether communication complying with a new communication protocol is possible, a dedicated command or the like must be prepared. It is difficult to confirm whether communication is possible without changing an existing rule (PTP (Picture Transfer Protocol) or the like).

DISCLOSURE OF INVENTION

The present invention has been made in consideration of the above situation, and has as its feature to provide a recording system capable of quickly confirming the communication function of a connected image supply device, a recording apparatus, and a control method therefor.

According to the present invention, there is provided a recording apparatus which is connected to an image supply device via a general-purpose interface, receives image data from the image supply device, and records the image data, characterized by comprising:

first determination means for causing a physical layer which depends on hardware of the general-purpose interface to determine whether the image supply device supports a predetermined communication protocol;

second determination means for causing a transport layer which controls communication as an upper layer of the physical layer to determine whether the image supply device supports the predetermined communication protocol; and control means for, when either of said first and second determination means determines that the image supply device supports the predetermined communication protocol, deciding that the image supply device supports the predetermined communication protocol, and when both of said first and second determination means do not determine that the image supply device supports the predetermined communication protocol, causing an application layer serving as an upper layer of the transport layer to determine whether the image supply device supports the predetermined communication protocol.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the descriptions, serve to explain the principle of the invention.

BEST MODE FOR CARRYING OUT THE INVENTION

Preferred embodiments of the present invention will be described in detail below with reference to the accompanying drawings.

Figure 1:
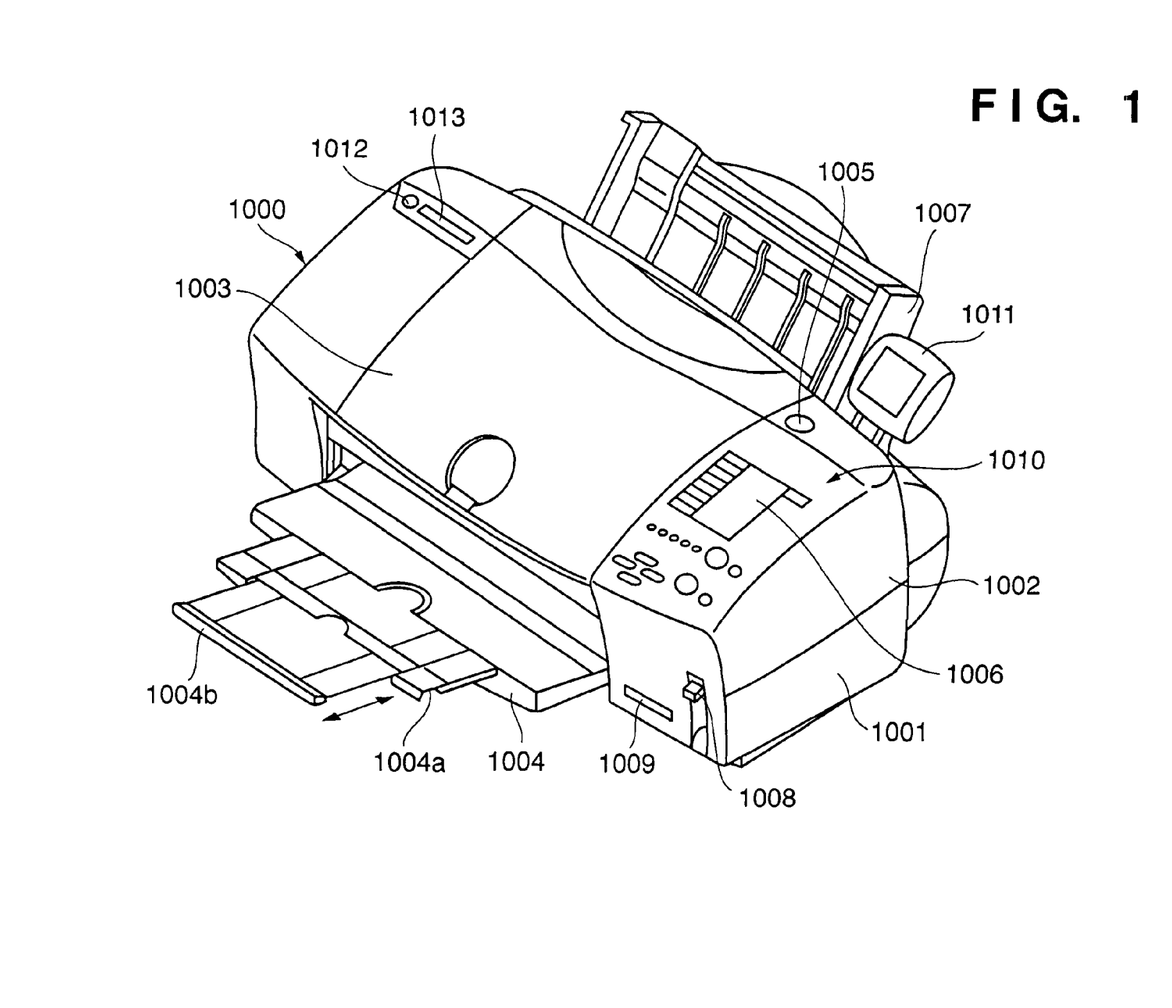
FIG. 1 depicts a schematic perspective view of a PD printer according to an embodiment of the present invention.

FIG. 1 depicts a schematic perspective view of a photo direct printer (to be referred to as a PD printer hereinafter) 1000 according to an embodiment of the present invention.

The PD printer 1000 has a general PC printer function of printing data received from a host computer (PC), and a function of printing image data directly read from a storage medium such as a memory card or printing image data directly received from a digital camera.

Referring to FIG. 1, a main body which forms a housing of the PD printer 1000 according to this embodiment has a case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. For this reason, upon making the printer execute a print process, the exhaust tray 1004 is rotated toward the front surface side to open the opening, so that printed sheets can be exhausted from the opening. The exhausted printed sheets are stacked on the exhaust trays 1004 in turn. The exhaust tray 1004 stores two auxiliary trays 1004a and 1004b. When these auxiliary trays are pulled out as needed, the loading area of print sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of the lever using a microswitch or the like, the open/close state of the access cover can be detected.

A power key 1005 is provided on the upper surface of the upper case 1002. A control panel 1010 which comprises a liquid crystal display unit 1006, various key switches, and the like is provided on the right side of the upper case 1002. The structure of the control panel 1010 will be described in detail later with reference to FIG. 2. Reference numeral 1007 denotes an automatic feeder which automatically conveys a print sheet into the apparatus main body. Reference numeral 1008 denotes a paper gap select lever which is used to adjust the gap between the printhead and a print sheet. Reference numeral 1009 denotes a card slot which receives an adapter that can receive a memory card. Via this adapter, image data stored in the memory card can be directly fetched and printed. As this memory card (PC card), a compact flash Memory™, smart Media™ card, memory stick, and the like are available. Reference numeral 1011 denotes a viewer (liquid crystal display unit) which is detachable from the main body of the PD printer 1000, and is used to display an image for one frame, index image, and the like, when the user wants to search images stored in the PC card for an image to be printed. Reference numeral 1012 denotes a USB terminal used to connect a digital camera (to be described later). Also, another USB connector used to connect a personal computer (PC) is provided on the rear surface of this PD printer 1000.

Figure 2:
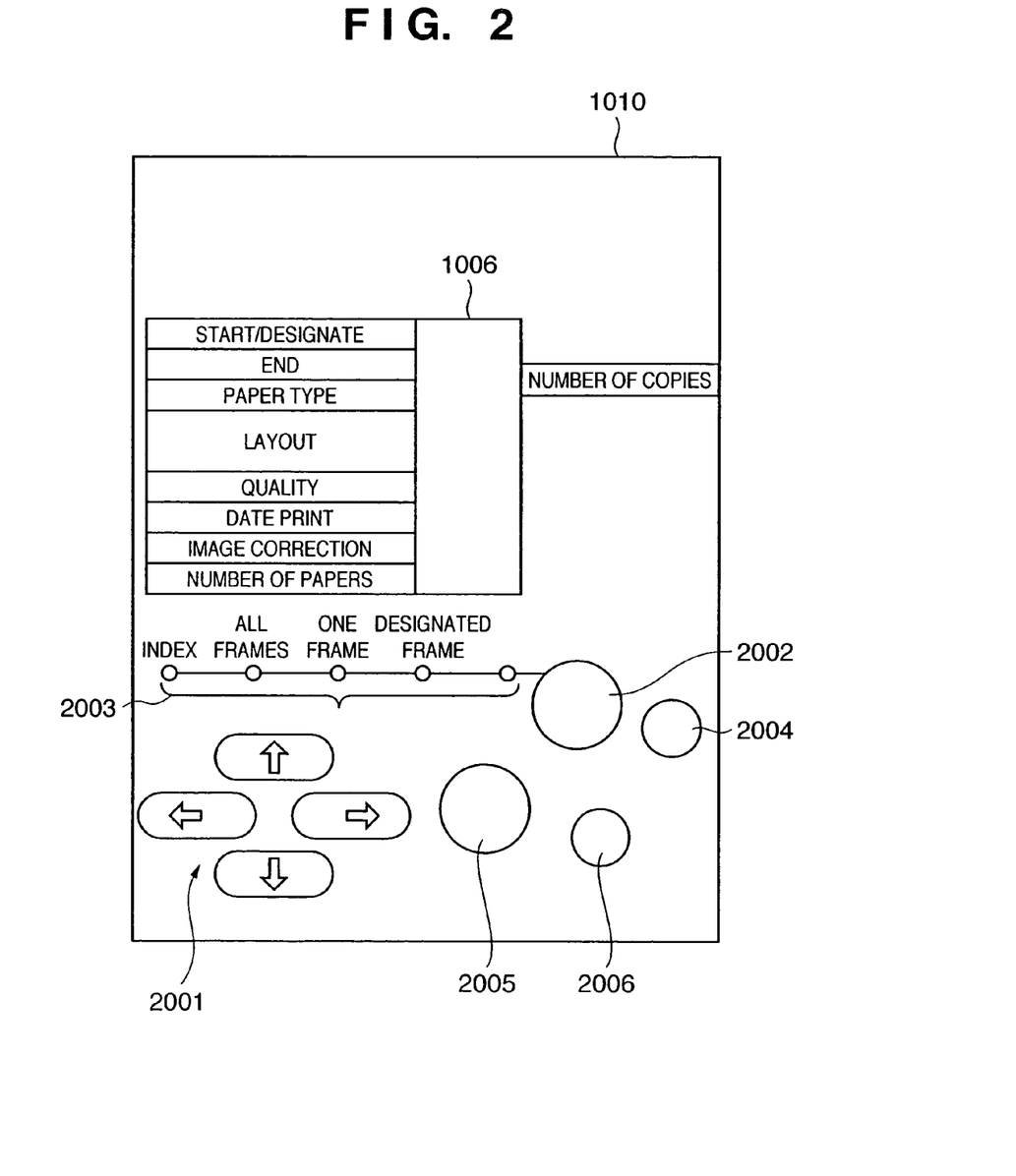
FIG. 2 depicts a schematic view of the control panel of the PD printer according to the embodiment.

FIG. 2 depicts a schematic view of the control panel 1010 of the PD printer 1000 according to this embodiment.

Referring to FIG. 2, the liquid crystal display unit 1006 displays menu items used to set data associated with item names printed on the right and left sides of the unit 1006. The items displayed there include, e.g., the first number or designated frame number of an image group to be printed (start frame designation/print frame designation), the last number of the image group to be printed (end), the number of copies to be printed (copy count), the type of paper sheet (print sheet) used in a print process (paper type), the setup of the number of photos to be printed per print sheet (layout), designation of print quality (quality), designation as to whether or not to print a photographing date (date print), designation as to whether or not to print a photo after correction (image correction), display of the number of print sheets required for the print process (print sheet count), and the like. These items are selected or designated using cursor keys 2001. Reference numeral 2002 denotes a mode key. Every time this key is pressed, the type of print (index print, all-frame print, one-frame print, and the like) can be switched, and a corresponding one of LEDs 2003 is turned on in accordance with the selected type of print. Reference numeral 2004 denotes a maintenance key which is used to do maintenance of the printer (e.g., cleaning of the printhead). Reference numeral 2005 denotes a print start key which is pressed when the start of a print process is instructed or when the maintenance setup is settled. Reference numeral 2006 denotes a print cancel key which is pressed when a print process or maintenance is canceled.

The arrangement of principal part associated with the control of the PD printer 1000 according to this embodiment will be described below with reference to FIG. 3. Note that the same reference numerals in FIG. 3 denote parts common to those in the above drawings, and a description thereof will be omitted.

Figure 3:
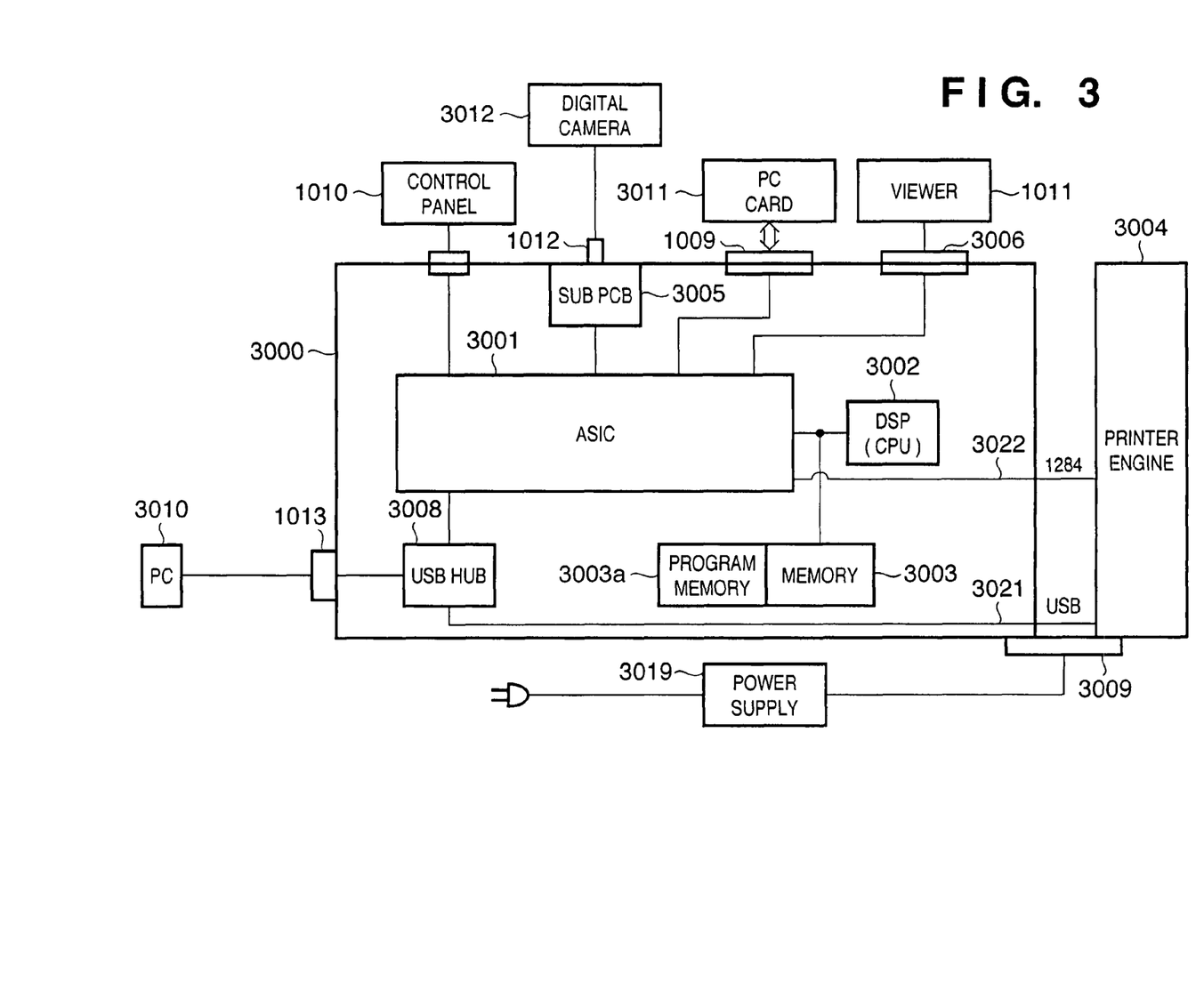
FIG. 3 is a block diagram showing the arrangement of principal part associated with control of the PD printer according to the embodiment.

Referring to FIG. 3, reference numeral 3000 denotes a controller (control board). Reference numeral 3001 denotes an ASIC (dedicated custom LSI). The arrangement of the ASIC 3001 will be described later with reference to the block diagram of FIG. 4. Reference numeral 3002 denotes a DSP (digital signal processor), which includes a CPU and executes various kinds of control to be described later, and image processes such as conversion from a luminance signal (RGB) into a density signal (CMYK), scaling, gamma conversion, error diffusion, and the like. Reference numeral 3003 denotes a memory, which has a memory area that serves as a program memory 3003a for storing a control program to be executed by the CPU of the DSP 3002, a RAM area for storing a running program, and a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera 3012. Reference numeral 3006 denotes a connector for connecting the viewer 1011. Reference numeral 3008 denotes a USB hub (USB HUB). When the PD printer 1000 executes a print process based on image data from a PC 3010, the USB hub 3008 allows data received from the PC 3010 to pass through it, and outputs the data to the printer engine 3004 via a USB 3021. In this way, the PC 3010 connected to the printer can execute a print process by directly exchanging data, signals, and the like with the printer engine 3004 (the printer serves as a normal PC printer). Reference numeral 3009 denotes a power supply connector, which inputs a DC voltage which is converted from commercial AC power by a power supply 3011. The PC 3010 is a general personal computer. Reference numeral 3011 denotes a memory card (PC card) mentioned above; and 3012, the digital camera (DSC: Digital Still Camera).

Note that signals are exchanged between the controller 3000 and the printer engine 3004 via the USB 3021 or an IEEE1284 bus 3022.

Figure 4:
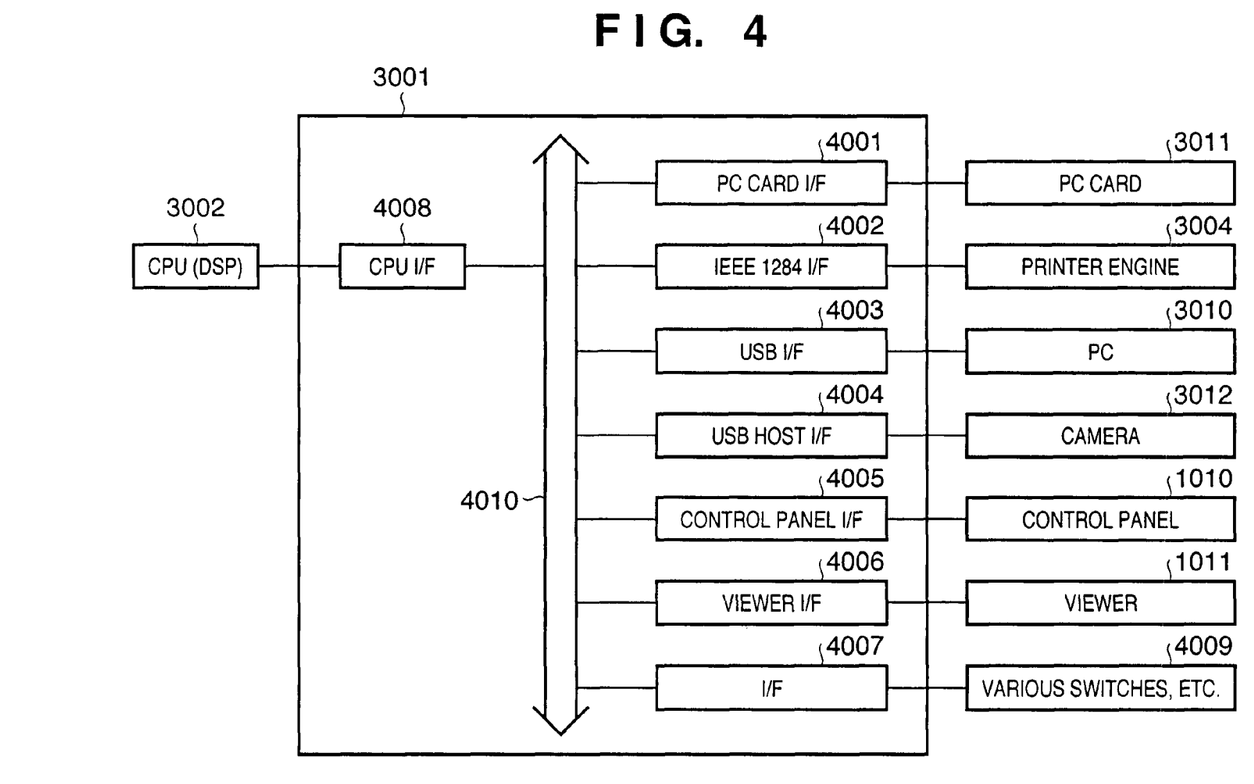
FIG. 4 is a block diagram showing the arrangement of an ASIC of the PD printer according to the embodiment.

FIG. 4 is a block diagram showing the arrangement of the ASIC 3001. Also in FIG. 4, the same reference numerals denote parts common to those in the above drawings, and a description thereof will be omitted.

Reference numeral 4001 denotes a PC card interface, which is used to read image data stored in the inserted PC card 3011, and to write data in the PC card 3011. Reference numeral 4002 denotes an IEEE1284 interface, which is used to exchange data with the printer engine 3004. The IEEE1284 interface 4002 is a bus used when image data stored in the digital camera 3012 or PC card 3011 is to be printed. Reference numeral 4003 denotes a USB interface, which exchanges data with the PC 3010. Reference numeral 4004 denotes a USB host interface, which exchanges data with the digital camera 3012. Reference numeral 4005 denotes a control panel interface, which receives various operation signals from the control panel 1010, and outputs display data and the like to the display unit 1006. Reference numeral 4006 denotes a viewer interface, which controls display of image data on the viewer 1011. Reference numeral 4007 denotes an interface, which controls interfaces with various switches, LEDs 4009, and the like. Reference numeral 4008 denotes a CPU interface, which exchanges data with the DSP 3002. Reference numeral 4010 denotes an internal bus (ASIC bus), which interconnects these interfaces.

Figure 5:
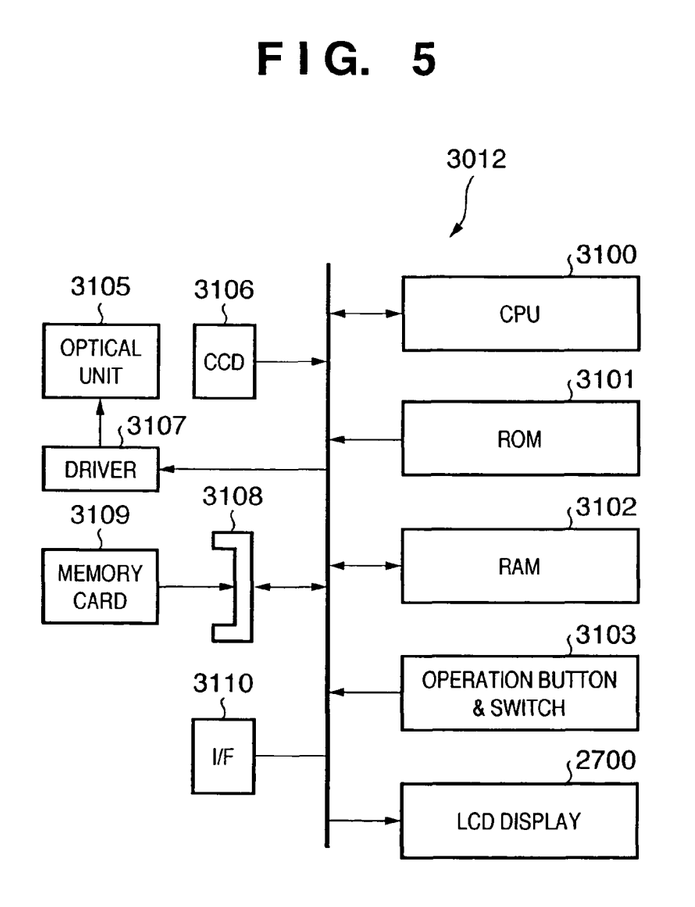
FIG. 5 is a block diagram showing the arrangement of a digital camera according to the embodiment.

FIG. 5 is a block diagram showing the typical arrangement example of the DSC 3012 according to the embodiment of the present invention. Of digital cameras connectable to the PD printer 1000 of this embodiment, some devices may not have a display 2700 (to be described later).

Referring to FIG. 5, reference numeral 3100 denotes a CPU which controls the entire DSC; and numeral 3101 denotes a ROM which stores the processing sequence of the CPU 3100. Reference numeral 3102 denotes a RAM which is used as a work area of the CPU 3100; and numeral 3103 denotes a switch group which is used to make various operations and includes various switches, cursor keys, and the like. The liquid crystal display 2700 is used to confirm a sensed image and display a menu upon making various setups. Reference numeral 3105 denotes an optical unit which mainly comprises a lens and its drive system. Reference numeral 3106 denotes a CCD element; and numeral 3107 denotes a driver which drives and controls the optical unit 3105 under the control of the CPU 3100. Reference numeral 3108 denotes a connector for connecting a storage medium 3109 (compact Flash™ memory card, smart media card, or the like); and numeral 3110 denotes a USB interface (the slave side of the USB) for connecting the PC or the PD printer 1000 of this embodiment.

In this embodiment, a case wherein the PD printer 1000 and DSC 3012 are connected to perform printing will be mainly exemplified. The purpose of this embodiment is to provide a PD printer capable of connecting a digital camera of each vendor and devices (DSPD: Digital Still Photography Devices) such as a cell phone and memory device to an image output apparatus such as the PD printer 1000, and printing on the basis of image data acquired from the devices. A communication protocol in connecting the PD printer 1000 according to this embodiment and these DSPDs to perform printing will be described. This embodiment proposes a new CDPS (Canon Direct Print Service) in which communication control between the PD printer and the DSPD is done using a general-purpose file and general-purpose format regardless of the interface.

The concept of a print service function is adopted in agreements for various communication protocol architectures between a DSPD and an image output apparatus, such as USB PTP (Still Image Class) and Mass Storage Class, Blue Tooth OBEX, and UPnP. The print service function is a set of execution functions in the application layer, and does not depend on various interfaces.

Figure 6:
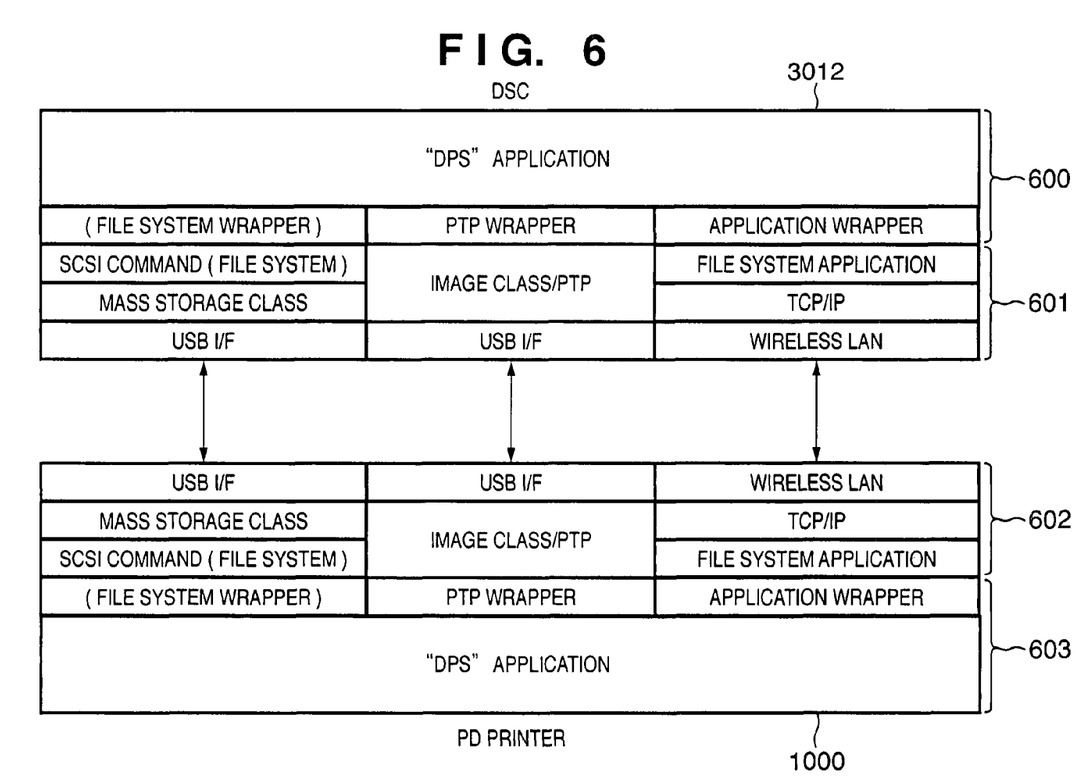
FIG. 6 depicts a conceptual view for explaining the interfaces and software configurations of the PD printer and digital camera which incorporate CDPS according to the embodiment.

FIG. 6 depicts a view showing the hierarchical structure of an interface function when the DSC 3012 as a typical DSPD and the PD printer 1000 as a typical image output apparatus are connected.

Referring to FIG. 6, reference numerals 600 and 603 denote application portions; and numerals 601 and 602 denote physical layers for a USB I/F and Bluetooth. The DSC 3012 and PD printer 1000 respectively incorporate the application portions 600 and 603 to construct a CDPS system. The CDPS system assumes mounting of architectures such as PTP and BIP of the protocol layer and file systems in MSC (Mass Storage Class), as represented by 601 and 602. The entity of the print service function exits in the application portions 600 and 603, and the print service function is executed by a portion at which CDPS is converted into each protocol.

In this manner, the direct print service can be realized between the DSC 3012 and the PD printer 1000 regardless of the physical interface.

Figure 7:
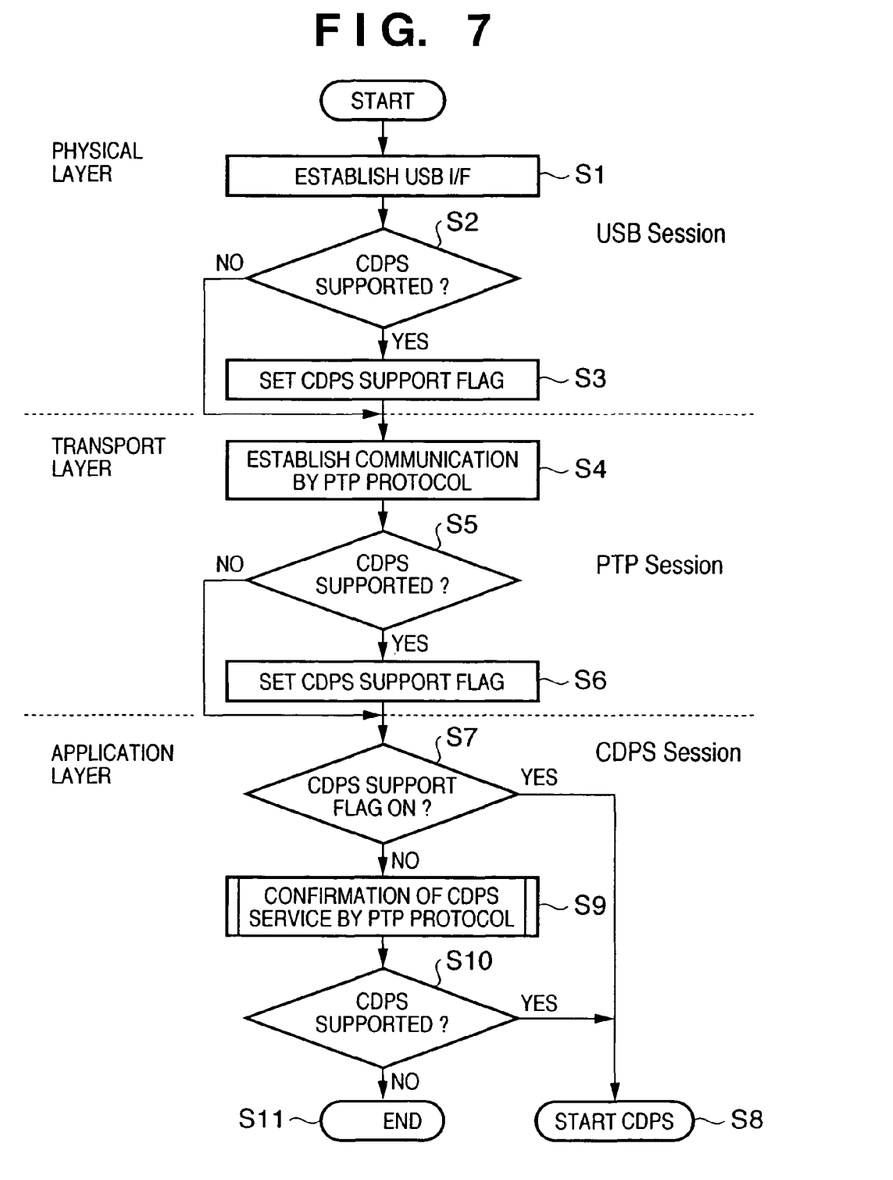
FIG. 7 is a flow chart for explaining CDPS communication procedure confirmation processing in the PD printer according to the embodiment.
Figure 8:
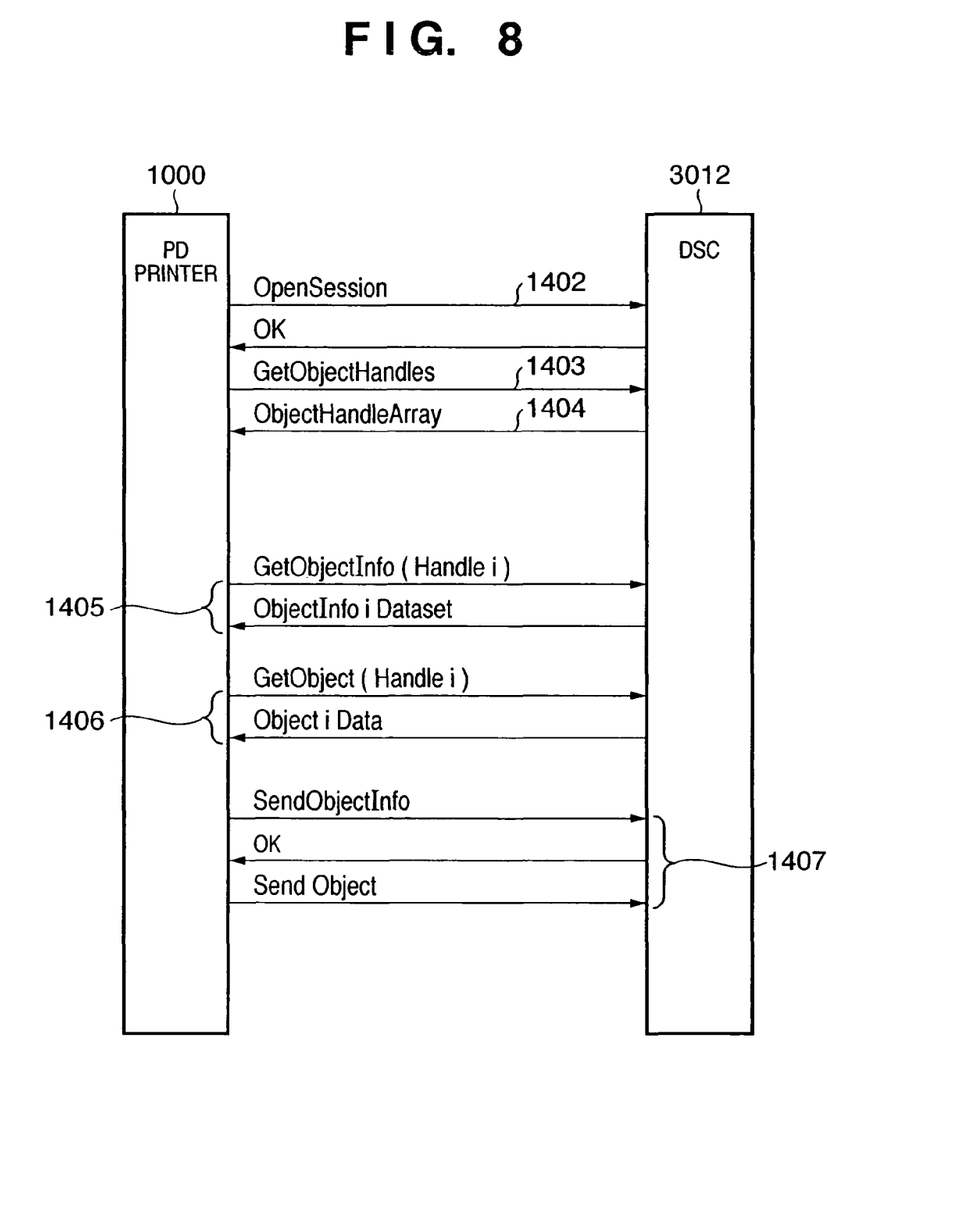
FIG. 8 depicts a view for explaining CDPS service discovery (CDPS_ServiceDiscovery) by PTP in step S9 of FIG. 7.

FIG. 7 is a flow chart showing confirmation processing of whether the communication protocol CDPS is supported between the PD printer 1000 and the DSC 3012 in this embodiment. FIG. 8 depicts a view for explaining processing in step S9 of FIG. 7. Before a description of processing shown in FIG. 7, confirmation processing for the communication protocol CDPS service in FIG. 8 will be explained.

In 1402, the printer 1000 assigns the DSC 3012 as a resource in OpenSession. If necessary, a start request for a procedure of assigning a handle to a data object, or performing special initialization is issued. If the DSC 3012 sends back an acknowledgement (OK) in response to this, PTP communication starts. In 1403, if all handles in the script format are requested from the DSC 3012 (GetObjectHandles) (Storage ID: FFFFFF, Object Type: Script), a list of all handles held by the DSC 3012 is sent back (ObjectHandleArray 1404). In 1405, information on the ith object handle (Handle i) (i=1 to n (n is the number of handles)) is acquired from the PD printer 1000. In 1406, the ith object (Object i Data) is acquired. If the object contains a keyword (e.g., "Marco") representing the identification of the DSC 3012, the PD printer 1000 designates transmission of object information (SendObjectInfo) in 1407. If an acknowledgement (OK) is received in response to this, the object is transmitted from the PD printer 1000 to the DSC 3012 by SendObject. The object contains, e.g., "Pole" as a response keyword (password) to the above-mentioned keyword. As a result, whether the PD printer 1000 and DSC 3012 support CDPS can be determined between the PD printer 1000 and the DSC 3012.

In the above example, all image files held by the DSC 3012 must be searched before the DSC 3012 sends back "Marco" (password) in response to "GetObject i". When many image files are held, a long time is taken for the PD printer 1000 to receive "Marco".

For example, when the memory card of the camera 3012 stores a large amount of image data (objects), the attributes of all files including image data must be confirmed for creating a script handle list. After that, a script handle list of only script files must be created. A long time is taken for notifying the printer 1000 of the script handle list. A time until the camera 3012 and printer 1000 confirm whether they have a communication function complying with a predetermined communication protocol becomes long.

To prevent this, the following method is employed for providing a printer capable of quickly confirming the communication function of an image supply device (in this case, the DSC 3012) connected to the PD printer 1000 and shifting to the communication mode, and its control method.

Whether shift to a predetermined communication mode is possible is determined in each of a plurality of hierarchical layers which realize an interface between the PD printer 1000 and the DSC 3012. Immediately when shift is determined to be possible by determination in any hierarchical layer from the determination result, the mode shifts to the communication mode. At this time, determination is sequentially executed from lower layers. If shift is determined to be impossible, determination using a password in the above-described application layer is finally executed.

FIG. 7 is a flow chart showing confirmation processing of whether the communication protocol CDPS is supported between the PD printer 1000 and the DSC 3012 in this embodiment. In this example, the PD printer 1000 and DSC 3012 are connected via a USB interface.

In step S1, if the PD printer 1000 and DSC 3012 are connected via a USB cable, a USB I/F is established.

A GetStringDescriptor command is issued in the USB I/F to acquire device (DSC 3012) information. The device (DSC 3012) sends back a manufacturer (Manufacture) and product name (Product) in response to the GetStringDescriptor command.

In step S2, whether the connected DSC 3012 supports the communication protocol CDPS is determined on the basis of the manufacture name and product name contained in a string representing a manufacturer (Manufacture) and product name (Product) in indices 1 and 2 (Index1, Index2) defined by the USB interface. If the DSC 3012 is determined to support CDPS, the flow advances to step S3 to set a CDPS support flag in the memory 3003, and to step S4. If NO in step S2, the flow advances from step S2 to step S4.

In step S4, communication by PTP as an upper layer of the USB I/F layer (601 and 602 in FIG. 6) is established. The flow advances to step S5 to issue "GetDeviceInfo" to the DSC 3012. The manufacturer name and product name (including a version) of the connected DSC 3012 and the like are determined on the basis of "Manufacture", "Model", "DeviceVersion", and "SerialNumber" contained in "DeviceInfo Dataset" sent back from the DSC 3012 in response to "GetDeviceInfo". Whether the connected DSC 3012 supports the above-described communication protocol CDPS is determined on the basis of the manufacturer name and product name.

As a determination method, whether returned information contains a predetermined character string, code, or the like, whether the number of characters is a predetermined one, or whether returned contents change a plurality of number of times may be determined.

If the DSC 3012 is determined to support CDPS, the flow advances to step S6 to set the CDPS support flag in the memory 3003, and to step S7. If NO in step S5, the flow advances from step S5 to step S7.

In step S7, whether the CDPS support flag in the memory 3003 is ON is determined. If YES in step S7, the flow advances to step S8 to start communication based on CDPS.

If it is determined in step S7 that the CDPS support flag in the memory 3003 is OFF, i.e., the above-mentioned corresponding information is not described in the obtained string such as a GetStringDescriptor command in the USB I/F, or the above-mentioned corresponding information is not contained in "DeviceInfo Dataset" by PTP, the flow advances to step S9 to determine by a PTP protocol whether the DSC 3012 can support CDPS. If YES in step S10, the flow advances to step S8 to start communication based on CDPS; if NO, confirmation processing ends without entering the CDPS communication mode.

CDPS support determination in the USB I/F may be performed on the basis of not information obtained by a GetStringDescriptor command but another information obtained using another command such as GetVendorDescriptor.

In this embodiment, determination is done in two, physical and transport layers in addition to the application layer. However, determination is not always performed in the two layers, and may be performed in any layer as far as determination is done prior to determination in the application layer and determination in the application layer can be skipped. As the determination method, another method may be adopted.

Second Embodiment

In the first embodiment, determination is executed in a plurality of hierarchical layers which constitute an interface. In the second embodiment, 1. determination in at least one hierarchical layer is indispensable, and
2. in this case, determination in the lowest layer suffering many hardware restrictions, i.e., in a USB interface in the above-described embodiment is dispensable.

More specifically, in the first embodiment, whether shift to CDPS is impossible is checked in the physical, transport, and application layers. If CDPS is finally determined to be supported in step S7 of FIG. 7 by check in a layer lower than the application layer, check in the application layer is omitted, and the mode shifts to the CDPS mode. To the contrary, in the second embodiment, if shift to CDPS is determined to be possible in step S3 or step S5 in the example of FIG. 7, the flow directly advances to step S8 to enter the CDPS mode.

With this setting, high-speed connection can be stably realized with less mounting burden while maintaining future development and expandability.

Third Embodiment

In the first and second embodiments, the printer 1000 executes determination because the PD printer 1000 serves as USB-Host. In a system such as USB-OTG (On The Go) in which the DSC 3012 serves as a host, the above-described relationship is reversed. In this case, the DSC 3012 may determine whether shift to CDPS is possible.

That is, in the third embodiment, the positions of a PD printer 1000 and DSC 3012 are exchanged in FIG. 8. The flow chart of FIG. 7 is interpreted as processing by the DSC 3012.

In the first to third embodiments, a PTP protocol is used in a USB interface, but the present invention is not limited to this. For example, also in connection by a wireless LAN such as Bluetooth in FIG. 6 or SCSI connection, whether CDPS is supported may be determined by the hardware of an interface and a module executed in the interface before an application confirms whether CDPS is supported.

The present invention may be applied to a system including a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiments (processes executed on the camera side and various print processes executed on the printer side) is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

The functions of the above-described embodiments are further realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

As described above, according to the embodiments, an image supply device (e.g., camera) and a printing apparatus such as a printer are connected. Image data is transmitted from the image supply device to the printing apparatus, and printed. In this arrangement, whether the image supply device and printing apparatus support a predetermined communication protocol is confirmed in the physical layer depending on interface hardware or the transport layer depending on a communication protocol before whether they support the predetermined communication protocol is confirmed in the application layer. If the image supply device and printing apparatus are confirmed in either of the physical and transport layers to support the communication protocol, confirmation processing by the application layer can be omitted.

Accordingly, whether the image supply device and printing apparatus support a predetermined communication protocol can be quickly confirmed.

The embodiments employ confirmation processing in the physical layer which depends on hardware, can achieve quick confirmation, but has a low degree of freedom, confirmation processing in the application layer which has a high degree of freedom but requires a long confirmation time, and confirmation processing in the transport layer between the physical layer and the application layer. If confirmation processing in a layer lower than the application layer is completed before confirmation processing in the application layer, confirmation processing in the application layer can be omitted.

Particularly, it may take a longer time than confirmation of all object handles to confirm in the application layer using a PTP protocol whether communication by a predetermined communication protocol is possible.

According to the present invention, confirmation processing in an upper layer can be omitted by determining in a lower layer whether communication by the above-mentioned communication protocol in the upper layer is possible.

Further, the application layer time can be shortened by automatically performing communication by a predetermined communication protocol in accordance with establishment of communication in an upper layer.

Shift to a predetermined communication protocol becomes smooth, resulting in good usability.

In the embodiments, confirmation processing of whether a communication protocol is supported is set as confirmation of "communication protocol is supported". The present invention is not particularly limited to this example, and may be applied to another confirmation processing as far as the gist of the present invention is realized.

For example, confirmation processing may be set as confirmation of "communication protocol is not supported". As a detailed example of the confirmation method, similar to confirmation of "communication protocol is supported", Descriptor information acquired by a Descriptor acquisition command such as GetStringDescriptor may be analyzed in a USB I/F. For PTP, Dataset information acquired by Dataset acquisition operation such as GetDeviceInfo may be analyzed.

When the predetermined communication protocol is determined not to be supported, shift processing to an upper layer is canceled. Even if processing does not shift to an upper layer, it can be decided that communication by the predetermined communication protocol using the upper layer is not established.

If communication by the predetermined communication protocol is determined to be impossible, a warning to the user can be provided more quickly by setting a display control of displaying that communication by the predetermined communication protocol is impossible, on a display unit of at least one of an image supply device and image printing device.

In the embodiments, the PD printer is set as a USB host, and the DSC is set as a slave. The present invention is not particularly limited to this combination, and any devices may function as a host and slave as far as the gist of the present invention is realized.

Conceivable image supply devices are a PDA, cell phone, television, video device, image storage device, and the like, in addition to a digital camera.

A general-purpose interface includes connection to a network such as the Internet, in addition to the above-mentioned USB and IEEE 1394.

The present invention is not limited to the above embodiments and various changes and modifications can be made within the spirit and scope of the present invention. Therefore, to apprise the public of the scope of the present invention, the following claims are made.

The invention claimed is:

1. A communication apparatus for performing a communication with an external device in accordance with a direct print protocol on an application layer, the apparatus comprising:

a determination unit that determines whether or not the communication with the external device is able to be performed on a predetermined communication layer being lower than the application layer in accordance with the direct print protocol, based on a confirmation process on the predetermined communication layer of multiple communication layers configuring a communication interface with the external device, the confirmation process on the predetermined communication layer confirming whether the external device is compliant with the direct print protocol; and a control unit that starts the communication with the external device on the application layer in accordance with the direct print protocol without executing a confirmation process on the application layer, if the determination unit determines that the communication with the external device is able to be performed on the predetermined communication application layer in accordance with the direct print protocol, wherein if the determination unit determines that the communication with the external device is not able to be performed on the predetermined communication layer in accordance with the direct print protocol, the control unit executes the confirmation process on the application layer, wherein the confirmation process on the application layer is executed to confirm whether the external device is compliant with the direct print protocol.

2. A communication apparatus according to claim 1, wherein the determination unit determines based on a reception of a predetermined object in the predetermined communication layer, wherein a handle list for identifying an object that the external device manages is received prior to the reception of the predetermined object.

3. A communication method of a communication apparatus for performing a communication with an external device in accordance with a direct print protocol on an application layer, the method comprising:

a determination step of determining whether or not the communication with the external device is able to be performed on a predetermined communication layer being lower than the application layer in accordance with the direct print protocol, based on a confirmation process on the predetermined communication layer of multiple communication layers configuring a communication interface with the external device, the confirmation process on the predetermined communication layer confirming whether the external device is compliant with the direct print protocol; and a control step of starting the communication with the external device on the application layer in accordance with the direct print protocol without executing a confirmation process on the application layer, if it is determined in the determination step that the communication with the external device is able to be performed on the predetermined communication layer in accordance with the direct print protocol, wherein if the determination step determines that the communication with the external device is not able to be performed on the predetermined communication layer in accordance with the direct print protocol, the control step executes the confirmation process on the application layer, wherein the confirmation process on the application layer is executed to confirm whether the external device is compliant with the direct print protocol.

4. A communication method according to claim 3, wherein the determination step determines based on a reception of a predetermined object in the predetermined communication layer, wherein a handle list for identifying an object that the external device manages is received prior to the reception of the predetermined object.

* * * * *